United States Patent [19]
Wagner

[11] Patent Number: 5,451,085
[45] Date of Patent: Sep. 19, 1995

[54] TOOL HANDLE HOLDER

[76] Inventor: Harry M. Wagner, 833 N. Beach St., Ormond Beach, Fla. 32174

[21] Appl. No.: 254,594

[22] Filed: Jun. 6, 1994

[51] Int. Cl.$^6$ ............................ A01B 1/22; B25G 3/20
[52] U.S. Cl. ..................................... 294/58; 16/114 R
[58] Field of Search ................... 294/1.1, 19.1, 25, 26, 294/50.8, 58; 15/143.1, 145; 16/110 R, 111 R, 113, 114 R, DIG. 25; 30/298, 323, 327; 43/21.2, 25; 135/71–73, 76; 224/218, 219, 222

[56] References Cited
U.S. PATENT DOCUMENTS

| | | | |
|---|---|---|---|
| 309,437 | 12/1884 | Calef | 294/58 X |
| 407,571 | 7/1889 | Calef | 294/58 X |
| 2,482,589 | 9/1949 | Maguire | 294/58 X |
| 2,710,571 | 6/1955 | Pfister | 294/26 X |
| 3,466,078 | 9/1969 | Sholund | 294/58 X |
| 4,155,582 | 5/1979 | Reisner | 294/58 |
| 4,477,114 | 10/1984 | Callis | 294/58 X |
| 4,888,846 | 12/1989 | Natale | 294/58 X |
| 5,060,343 | 10/1991 | Nisenbaum | 294/58 X |

FOREIGN PATENT DOCUMENTS 2248034  3/1992  United Kingdom ................ 294/58

Primary Examiner—Johnny D. Cherry
Attorney, Agent, or Firm—Edward M. Livingston

[57] ABSTRACT

A tool-handle holder has an arm loop (2) that fits on a person's forearm at an arm end of an attachment section (1) and a handle (3) at a hand end of the attachment section (1). The attachment section (1) between the arm loop (2) and the handle (3) is constructed for linear and lateral support of a clamp (4) in combination with a handle (3). The handle (3) is extended from the hand end of the attachment section (1) to a position in a plane that is parallel to the attachment section and bisects the arm loop (2). Basic construction can be achieved from one piece of PVC pipe having a desired diameter and heat-bent to form the handle (3) at the hand end and the arm loop (2) at the arm end of two juxtaposed sections of the PVC pipe which form the attachment section. Various forms of clamps can be attached to contain a handle of a tool or instrument separately from or buttressed against the attachment section. Reinforcement can be placed in the PVC pipe. The attachment section also can be an attachment beam extended between the arm loop (2) and the handle (3). Nonslip means and various forms of clamps can be used with either construction.

12 Claims, 4 Drawing Sheets

TOOL HANDLE HOLDER

BACKGROUND OF THE INVENTION

This invention relates to tool-handle holders that are positioned on a forearm and grasped by a hand of a user for single-handed operation of tools with two-hand handles.

Two-handed instead of single-handed use of hand rakes, brooms, pruning tools, pitchforks, handled nets, dustpans, power saws, swords, probing poles, protective staffs, canes, crutches, fishing poles, boat oars, scraping tools, hand-planting tools, guns and various other hand-held tools and instruments has been required previously. Single-handed operation and manipulation has been nearly impossible or extremely ineffective at best previously. With this invention, however, single-handed use is better than two-handed use has been for most of these tools and instruments. Single-handed use is now more effective, more accurate, faster and less tiring. In addition, conventional two-handed operation and manipulation of such tools and instruments has required bending and positioning of a user's body that can be unnecessarily burdensome, tiring, painful and obstructive of use-effectiveness.

Two-handed use of most such tools and instruments is not possible with a practical level of effectiveness for most of humanity due to different muscle capacity developed from normal activity than required for designed two-handed uses of such tools and instruments. Further yet, bodily injury, stiffness of bodily joints, agility, age, ability to bend one's body, insufficient back strength and other bodily conditions prevent or greatly hinder much of even the most capable people from effective two-handed use of such tools and instruments. Still further, freeing one hand and arm of a user to aid single-handed use and to achieve related objectives with the other hand and arm of the user is not possible with conventional two-hand handles.

Attempts have been made previously to solve some of these problems. Included has been an implement holder taught by Maguire in U.S. Pat. No. 2,482,589. The Maguire device taught a handle extended radially from the holder such that the handle was held and operated perpendicularly to a load on a tool or instrument attached to the holder. This had several fatal defects. For lifting, a load resistance was in line with the handle, such that a user's hand was required to grasp the handle tightly enough with sufficient work load to prevent the handle from slipping out of the user's hand in addition to applying work load for lifting. With the Maguire device, pivotal direction of a user's arm for side-sweeping action and for lifting action required that the handle be held perpendicularly to load resistance, such that bending moment or side-pressure torque was transmitted by the load to the hand. The side-pressure torque required work load in addition to work load for side-sweeping action and for arm-grasping action with tools and instruments. These additional work-load factors most often required more motive ability, muscle power and work, resulting in higher fatigue rate than for intended work with the tools and instruments. In addition to not applying physics of human-use effectiveness for handling tools and instruments, the Maguire device also required two clamps and a wire body that are structurally different from this invention.

U.S. Pat. No. 4,477,114 granted to Callis described a rake handle that was attachable to an arm of a user. But it had much of the same physical limitations of the Maguire device and was limited to use on only a rake handle instead of being attachable to a wide variety of tools and instruments.

U.S. Pat. No. 4,888,846 granted to Natale taught an asbestos-scraping assembly with which a handle of a scraper was attachable to a forearm of a user. It was effective for its limited use. But it was not as effective as attaching a scraper handle to the holding mechanism of this invention because it positioned the scraper where knuckles of a user were endangered when positioning the scraper for effective scraping action. Further, it did not allow side-sweep action in addition to forward-thrust action as made possible with this invention.

U.S. Pat. No. 4,822,087 granted to DeCarlo taught a lift-improvement device that had the exact limitations as the Maguire device but with an additional problem of not being attachable to a forearm of an individual. The physics of lifting with the human body were not addressed effectively in this or in other prior devices.

SUMMARY OF THE INVENTION

In light of problems that have existed and that continue to exist in this field, objectives of this invention are to provide a tool-handle holder which:

Is attachable to a user's forearm for single-handed use and operation of tools and instruments with two-handed handles or with single-handed handles;

Holds a wide variety of handles of tools and instruments firmly with a single attachment clamp;

Positions handles of tools and instruments optimally for control, movement and manipulation by a single arm;

Positions a tool-holder handle where it does not need to be grasped tightly to prevent being pulled from a hand for lifting or other tool-manipulative action;

Positions a tool-holder handle where it is not twisted with rotational torque against a handle from lifting or other tool-manipulative action;

Allows single-handed grasping without circumferential torque against a grasping hand;

Allows single-handed grasping without linearly pulling action from a grasping hand;

Allows use of only one clamp for quick and easy handle attachment and changing;

Allows use of a wide variety of clamps that can be changed and replaced easily;

Has a tool-holder handle in a position that a handle of a tool is not pulled off from lifting or other action;

Does not have sharp edges or other construction that is injurious or uncomfortable for use;

Is inexpensive to produce; and

Is light and easy to handle.

This invention accomplishes the above and other objectives with a tool-handle holder having an arm loop that fits on a person's forearm at an arm end of an attachment section and a tool-holder handle at a hand end of the attachment section. The attachment section between the arm loop and the tool-holder handle is constructed for linear and lateral support of a clamp in combination with a handle. The tool-holder handle is extended from the hand end of the attachment section to a position in a plane that is parallel to the attachment section and bisects the arm loop. Although a range of rigid materials may be used, basic construction can be achieved from one piece of polyvinylchloride ("PVC") pipe having a desired diameter and heat-bent to form the tool-holder handle at the hand end and the arm loop at the arm end of two juxtaposed sections of the PVC pipe which form the attachment section. Various forms of clamps can be attached to contain a handle of a tool or instrument separately from or buttressed against the attachment section. Reinforcement can be placed in the PVC pipe. The attachment section also can be an attachment beam extended between the arm loop and the tool-holder handle. Nonslip means and various forms of clamps can be used with either construction.

BRIEF DESCRIPTION OF THE DRAWINGS

This invention is described by appended claims in relation to a description of a preferred embodiment with reference to the following drawings which are described briefly as follows:

DESCRIPTION OF PREFERRED EMBODIMENT

Figure 1:
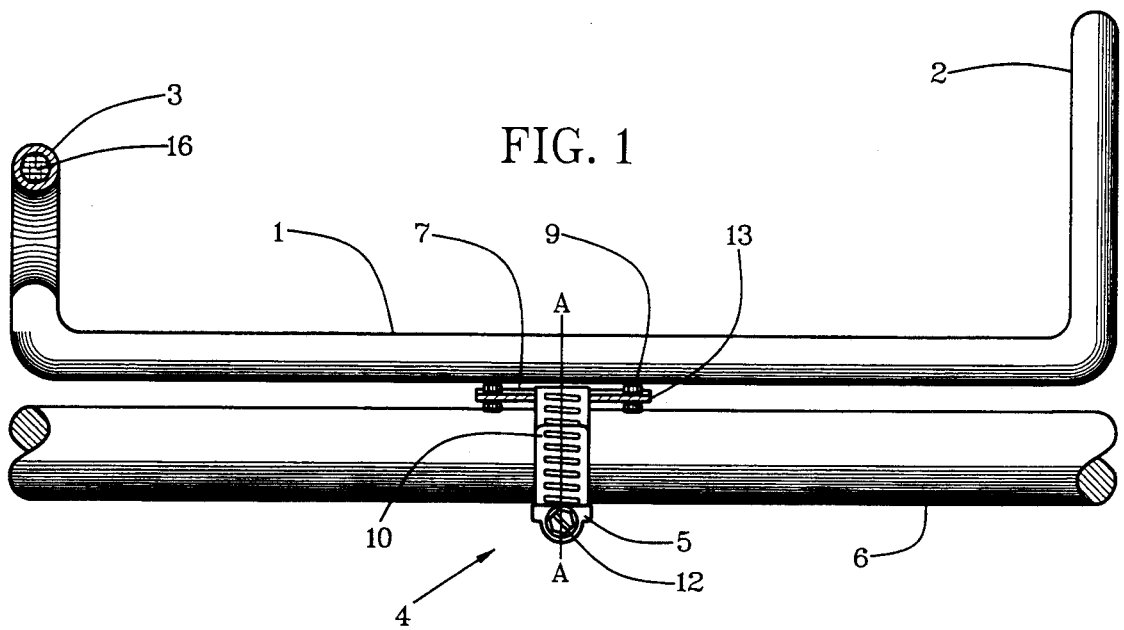
FIG. 1 is a side elevation view of an embodiment constructed from a single piece of polyvinylchloride (PVC) tube.

Reference is made first to FIGS. 1–11. An attachment body 1 has an arm loop 2 at an arm end and a handle 3 at a hand end. The arm loop 2 is sized and shaped to receive a forearm of a person. The handle 3 is bisectional of the arm loop 2 and planar to the attachment body 1 by crossing the arm loop at a position that bisects it in desired proportions in a plane parallel to the attachment body 1. A clamp 4 is attachable to the attachment body 1 at an opposite side of the attachment body 1 from the arm loop 2 and the handle 3. The clamp 4 can be any of a variety of conventional clamps such as the worm-strap clamp 5 shown containing a tool handle 6.

Figure 3:
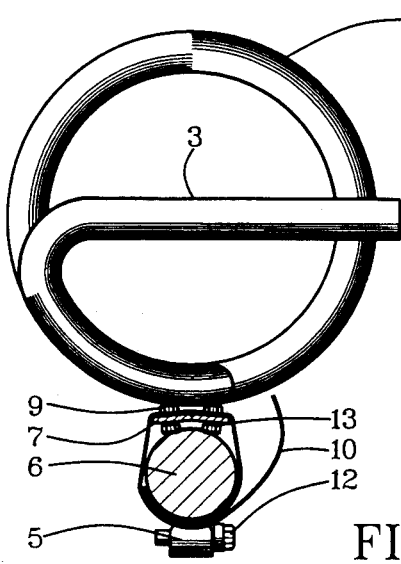
FIG. 3 is a hand-end view of the FIG. 1 illustration.
Figure 4:
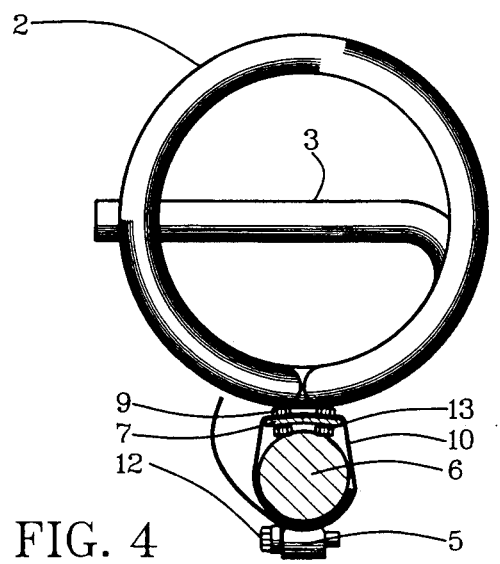
FIG. 4 is an arm-end view of the FIG. 1 illustration.
Figure 6:
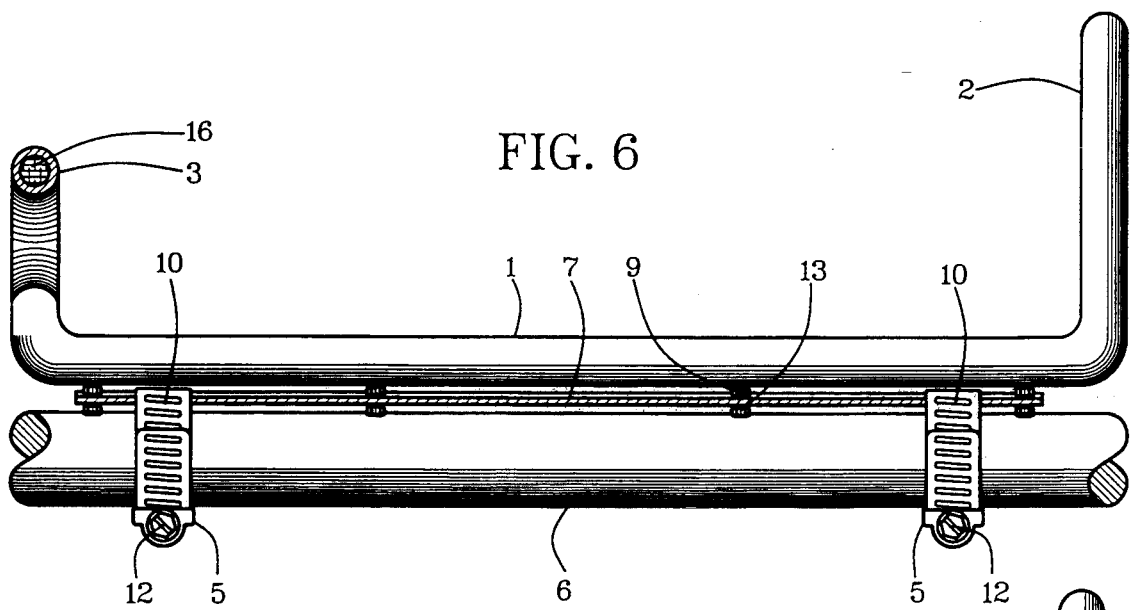
FIG. 6 is a side elevation view of an additional modification of the FIG. 1 embodiment with a single full-length clamping means.
Figure 7:
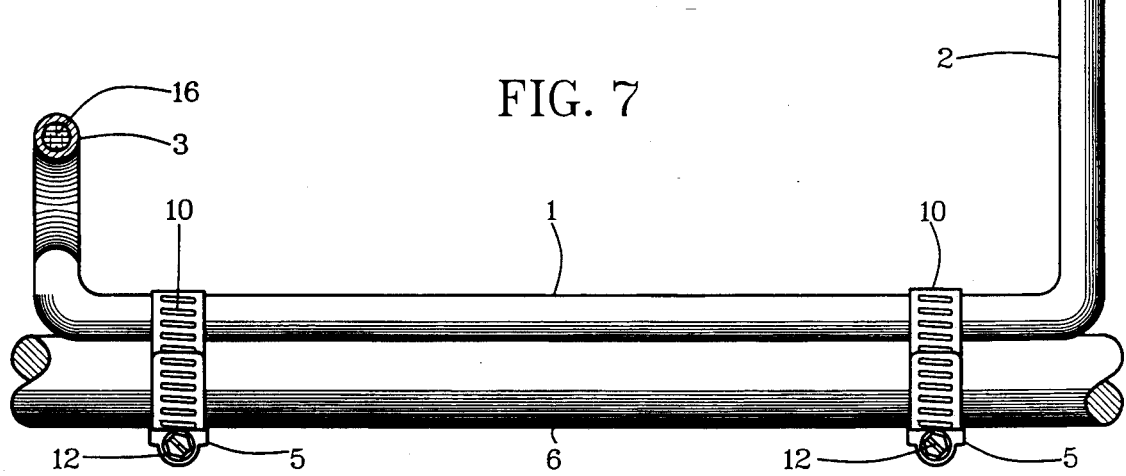
FIG. 7 is a side elevation view of an embodiment with two sections of a PVC tube forming an attachment channel between them and having two clamps.
Figure 8:
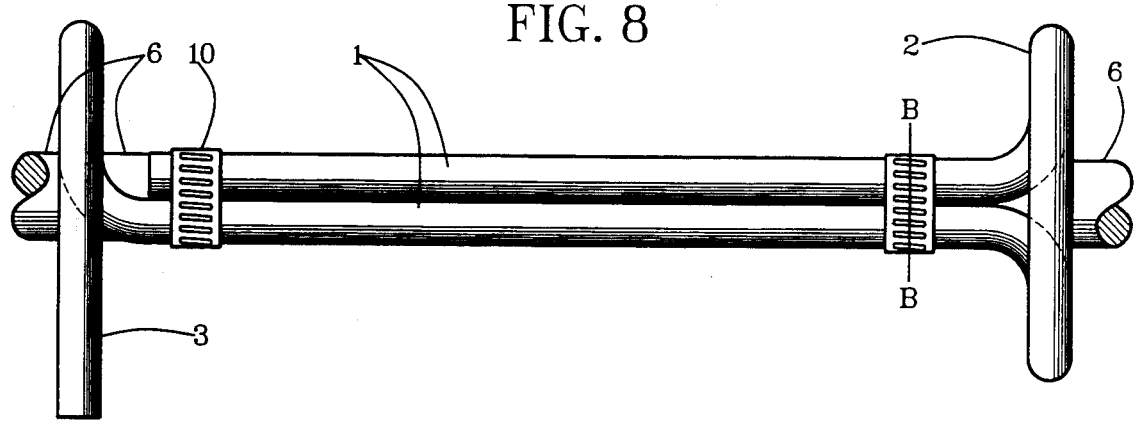
FIG. 8 is a top view of illustrations shown in FIG. 7.

The attachment body 1, the arm loop 2 and the handle 3 can all be constructed of a single piece of rod or tubing, represented as polyvinylchloride (PVC), tubing that is heat-bent to form these components. The arm loop 2 is bent circular and angled ninety degrees from two juxtaposed sections of the tubing. The handle 3 is bent arcuately to position a straight end of the tubing comprising the handle 3 to bisect the arm loop 2 in desired portions. FIGS. 1 and 5–8 show the arm loop 2 and the handle 3 at opposite ends of the attachment body 1 that is formed by two juxtaposed sections of a PVC tube. In FIG. 8, the arm loop 2 is shown between the two juxtaposed sections of a PVC tube and the handle 3 is shown extending arcuately from one of the two juxtaposed sections of the PVC tube. FIGS. 3 and 4 show the handle 3 bisecting the arm loop 2 at an opposite end of the two juxtaposed sections of PVC tube that comprise the attachment body 1.

Figure 2:
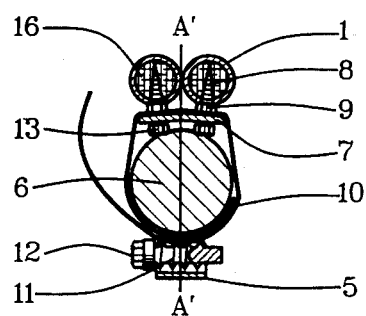
FIG. 2 is a partially cutaway and partially cross-sectional view of a section of the FIG. 1 illustration through section AA.
Figure 5:
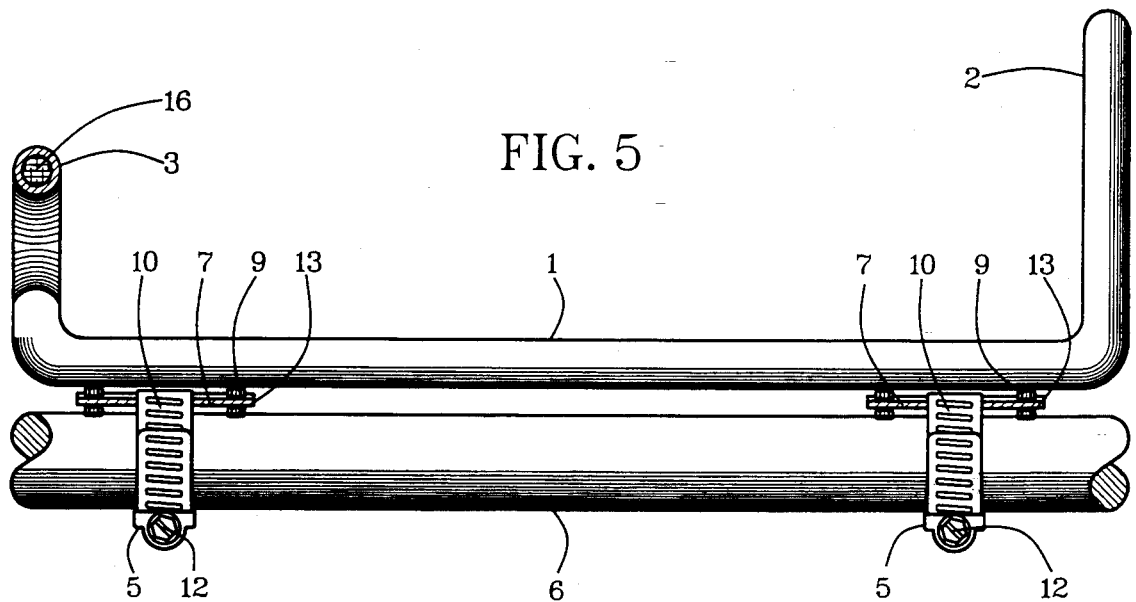
FIG. 5 is a side elevation view of a modification of the FIG. 1 embodiment with double clamping means.

In FIG. 2, a clamp strap is shown positioned on an attachment plate 7 attached to a side of the two juxtaposed sections of a PVC tube that comprise the attachment body 1. Fasteners 8 are used to attach the attachment plate 7 to the attachment body 1. Spacers 9 are positioned intermediate the attachment plate 7 and the attachment body 1 to provide space for insertion of an attachment strap 10 which is a clamp strap of the worm-strap clamp 5. The attachment strap 10 is tightened onto the tool handle 6 with a worm gear 11 that is rotated by a clamp knob 12. The attachment plate 7 can be arched or bent in a dihedral form as shown. As shown in FIGS. 1–6, fastener heads 13 of the fasteners 8 can be employed to provide a plurality of grasp projections for securing the tool handle 6 to prevent it from slipping when cinched tightly in a direction towards the attachment plate 7. There can be a plurality of attachment plates 7 as shown in FIG. 5. Alternatively, the attachment plate 7 can extend from-end-to-end of the attachment body 1 as shown in FIG. 6.

Figure 9:
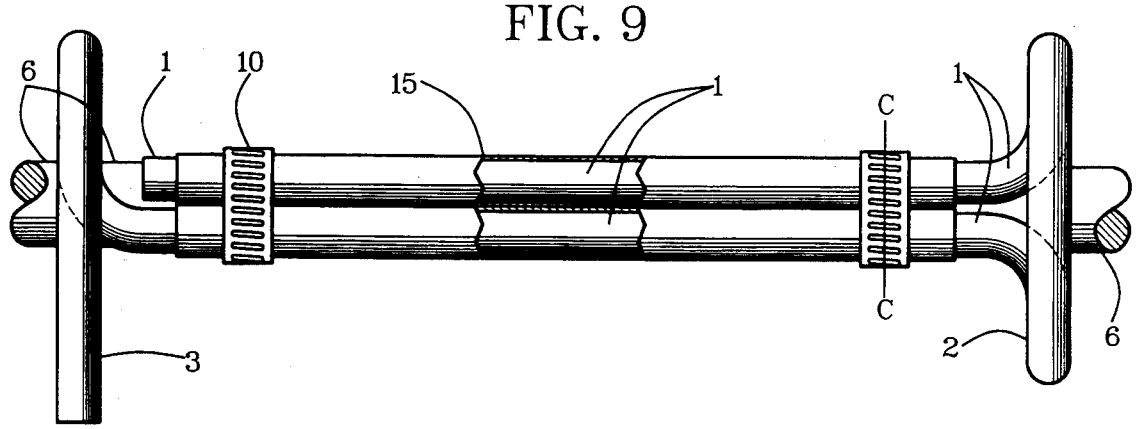
FIG. 9 is a top view showing nonslip surfaces on the two juxtaposed sections of PVC tube comprising an attachment channel illustrated in FIG. 7.
Figure 10:
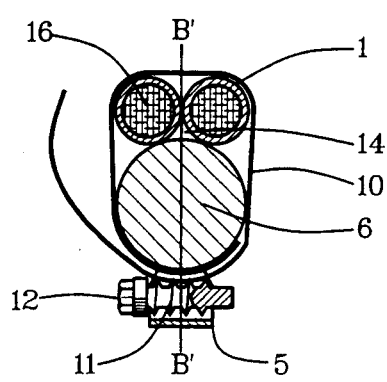
FIG. 10 is a partially cutaway and partially cross-sectional view of a section of the FIG. 8 illustration through section BB.
Figure 11:
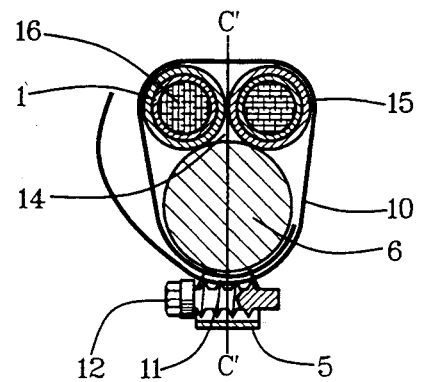
FIG. 11 is a partially cutaway and partially cross-sectional view of a section of the FIG. 9 illustration through section CC.

An attachment channel 14 shown in FIG. 10 can be provided between the two juxtaposed sections of PVC tube as an alternative to one or more attachment plates 7. The attachment strap 10 is positioned around the attachment body 1 and the tool handle 6 and the worm-strap clamp 5 cinched as shown in FIGS. 7–8 and 10. This is an alternative to use of the attachment plate 7. A rubberlike material 15 having a surface-designed for nonslip-grasping contact with tool handles 6 can be positioned on the two juxtaposed sections of PVC tube or, as a minimum, between the PVC tubing and the handle in the clamp area, that comprise the attachment body 1 in this embodiment as shown in FIGS. 9 and 11. Use of the attachment channel 14, the space between the attachment body tubes 1 and the tool handle 6, requires bending of the PVC tube in directions that do not traverse the attachment channel 14 between the attachment body 1 and either the arm loop 2 or the handle 3.

Any or all portions of the PVC tube can be reinforced with reinforcement material 16 as shown in FIGS. 1–2, 5–7 and 10–11. Most advantageous with reinforcement material 16 are the handle 3 as shown in FIGS. 1 and 5–7 and a fastener section of the attachment body 1 as shown in FIG. 2.

Figure 12:
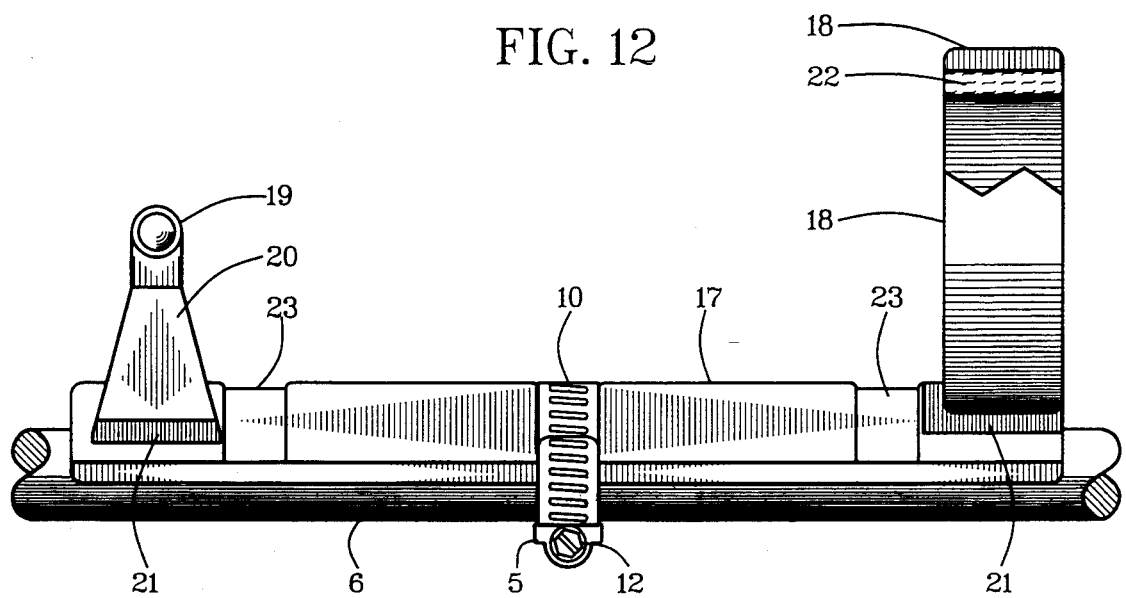
FIG. 12 is a partially cutaway side elevation view of an embodiment having a dihedral-angle beam as an attachment beam.
Figure 13:
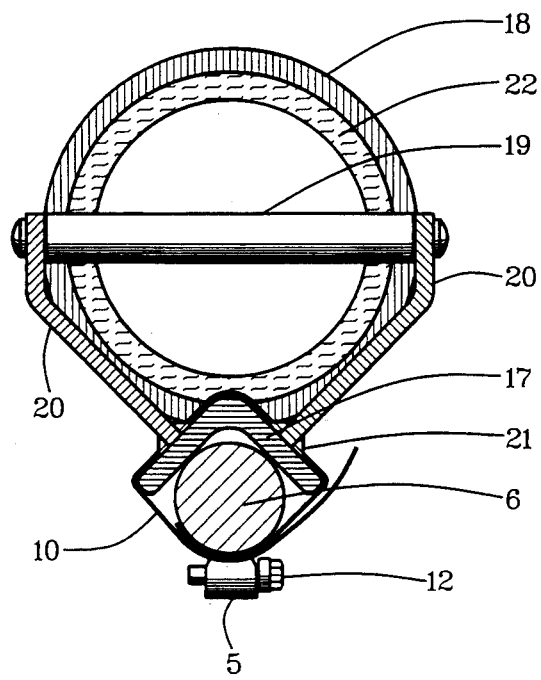
FIG. 13 is a hand-end view of the FIG. 12 illustration.
Figure 14:
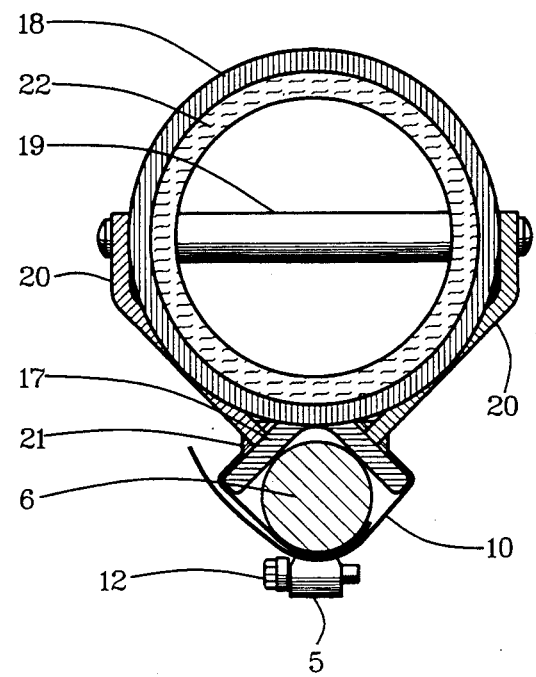
FIG. 14 is an arm-end view of the FIG. 12 illustration.

Referring now to FIGS. 12–14, a dihedral-angle beam 17 as a form of attachment beam can be employed in lieu of construction with tubing such as PVC tubing. The dihedral-angle beam 17 can be a standard or a specially designed aluminum angle beam. An arm-loop ring 18 can be welded or otherwise attached to the arm end and a double-support handle 19 can be welded or otherwise attached to the hand end of the dihedral-angle beam 17. The arm-loop ring 18 can be attached directly to the arm end of the dihedral-angle beam 17 at a position opposite an attachment channel that is intermediate adjacent walls of a dihedral angle of the dihedral-angle beam 17. Handle supports 20 can be attached to the hand end of the dihedral-angle beam 17 at a position opposite the attachment channel. Weldment material 21 is shown at junctures of the dihedral-angle beam 17 with the arm-loop ring 18 and the handle supports 20. However, mechanical fasteners can be employed in lieu of welding. An arm cushion 22 can be provided on an internal surface of the arm-loop ring 18 and the edges can be rounded as shown for construction with metallic materials.

One or more strap channels 23 can be positioned in a handle side of the dihedral-angle beam 17 and rounded to avoid arm contact with edges of the attachment strap 10. The worm-strap clamp 5 can be one or more heavy-duty, large sizes for heavy-duty use conditions. This attachment-beam embodiment of the invention is particularly suited to heavy-duty use conditions. However, for light duty and for low cost, the PVC embodiment described in relation to FIGS. 1-11 may be more suitable.

The embodiment shown in FIG. 12 may be constructed as an integral piece by plastic injection molding or made of aluminum by die-casting.

Different forms of attachment beams also can be employed. Foreseeable within this invention are channel beams, flat beams and various special-purpose beams. Special-purpose beams can have spline-like surfaces that mate with spline-like surfaces or otherwise compatible surfaces of handles 6 of tools and instruments.

A wide variety of clamps, such as forms of quick-release clamps, can be employed in lieu of the worm-strap clamp 5. The worm-strap clamp 5, however, is highly adaptable to a wide variety of handles 6. It is also inexpensive, easy to replace and available in a selection of duty grades. Compensation for quick-release features of alternative quick-release clamps can be a T-handle socket wrench small enough to carry on a key chain or to attach variously to a use-related position. The T-handle socket wrench can be operated by people who might have more difficulty operating a quick-release clamp. The T-handle socket would fit onto the clamp knob 12 that is illustrated as a hex bolt with a screw slot. Other means for operating the clamp knob 12 are foreseeable for various special-purpose markets and use conditions.

A new and useful tool-handle holder having been described, all such modifications, adaptations, substitutions of equivalents, combinations of parts, applications and forms thereof as described by the following claims are included in this invention.

I claim:

1. A tool-handle holder comprising:
   an attachment body extended intermediate an arm end proximate a forearm of a user and a hand end proximate a hand of the user;
   an arm loop extended perpendicularly from the arm end of the attachment body;
   the arm loop being sized and shaped to fit circumferentially onto the user's forearm;
   a handle that is approximately bisectional of the arm loop and lying in a plane parallel to a plane of the attachment body on the hand end of the attachment body;
   a clamp positioned on the attachment body and having clamping means on an opposite side of the attachment body from the arm loop and the handle.; and
   wherein the attachment body is comprised of two juxtaposed sections of a tube with the arm loop extended arcuately from an arm-bend end of the two juxtaposed sections and the handle is extended arcuately from a hand end of one of the two juxtaposed sections of the tube.

2. A tool-handle holder as described in claim 1 and further comprising:
   an attachment plate attached to a side of the two juxtaposed sections of tube on a side of the two juxtaposed sections of tube that is opposite a side of the two juxtaposed sections of tube from which the arm loop and the handle are extended.

3. A tool-handle holder as described in claim 2 and further comprising:
   a plurality of grasp projections extended from an attachment side of the attachment plate to positions of contact with a tool handle attached to the attachment side of the attachment plate.

4. A tool-handle holder as described in claim 3 wherein:
   the clamp is a worm-strap type having an attachment strap encompassing the attachment plate and a tool handle intermediate the attachment plate and a worm-screw means.

5. A tool-handle holder as described in claim 4 wherein:
   the attachment plate is shaped arcuately between the two juxtaposed sections of the tube in a manner to receive a side wall of a tool handle.

6. A tool-handle holder as described in claim 2 wherein:
   the attachment plate is shaped arcuately between the two juxtaposed sections of the tube in a manner to receive a side wall of a tool handle.

7. A tool-handle holder as described in claim 1 and further comprising:
   reinforcement material positioned in the tube.

8. A tool-handle holder as described in claim 1 wherein:
   the two juxtaposed sections of tube are positioned to provide an attachment channel between them to allow a tool handle to be positioned in the attachment channel.

9. A tool-handle holder as described in claim 8 wherein:
   the clamp is a worm-strap type having an attachment strap encompassing the two juxtaposed sections of tube and a tool handle intermediate the two juxtaposed sections of tube and a worm-screw means.

10. A tool-handle holder as described in claim 8 and further comprising:
    nonslip means attached to the two juxtaposed sections of tube proximate the attachment channel.

11. A tool-handle holder as described in claim 10 wherein:
    the nonslip means is rubberlike material having a surface designed for nonslip-grasping contact with desired tool handles.

12. A tool-handle holder as described in claim 11 wherein:
    the nonslip means is sleeves of the rubberlike material positioned on the two sections of juxtaposed tube at positions proximate the attachment channel.

* * * * *